United States Patent [19]

Mau

[11] 4,114,882

[45] Sep. 19, 1978

[54] VARIABLE VELOCITY CONTROL FOR PLAYING IMAGES FOR A MANUALLY CONTROLLED ELECTRONIC VIDEO DISPLAY GAME

[75] Inventor: Theodore A. Mau, Chicago, Ill.

[73] Assignee: Robert Ralph Runte, Palatine, Ill.

[21] Appl. No.: 736,951

[22] Filed: Oct. 29, 1976

[51] Int. Cl.² ............................................. A63F 9/00
[52] U.S. Cl. ........................... 273/85 G; 273/DIG. 28
[58] Field of Search ............. 273/1 E, 85 R, 102.2 R, 273/102.2 B, DIG. 28, 102.2; 340/323 R, 324 AD; 235/92 GA, 92 N

[56] References Cited

U.S. PATENT DOCUMENTS

| | | | |
|---|---|---|---|
| 3,809,395 | 5/1974 | Allison et al. | 273/101.2 X |
| 3,874,669 | 4/1975 | Ariano et al. | 273/85 R |
| 4,015,846 | 4/1977 | Runte et al. | 273/DIG. 28 |
| 4,026,555 | 5/1977 | Kirschner et al. | 273/102.2 R X |
| 4,053,740 | 10/1977 | Rosenthal | 273/DIG. 28 |

OTHER PUBLICATIONS

The Textbook of Video Game Logic; vol. 1; Kush N' Stuff Amusement Electronics; 1976; pp. 68-101.
Popular Electronics; "TV Electronic Game Projects"; Apr. 1976; pp. 35-45.
Radio Electronics; "Build This Great TV Game"; Jun. 1976; pp. 35-37, 79-81.
Radio Electronics; "Build This Great TV Game II"; Jul. 1976; pp. 56-58.

Primary Examiner—Vance Y. Hum
Attorney, Agent, or Firm—Anthony S. Zummer

[57] ABSTRACT

A variable velocity control for playing images for video games is disclosed herein. The variable velocity control for playing images for video games includes a play condition sensor. A horizontal playing image velocity control is connected to the play condition sensor. The play condition sensor receives signals from other portions of the manually controlled electronic video display game indicative of the number of times a ball image has intersected a paddle image. The play condition sensor then supplies a signal, related to a total count of intersections which it has stored, to the horizontal playing image velocity control. The horizontal playing image velocity control, in turn, controls the horizontal speed of the ball image partially in response to the playing parameters of the game and partially in response to a manual switch closing affected by a player.

13 Claims, 3 Drawing Figures

FIG. 2

VARIABLE VELOCITY CONTROL FOR PLAYING IMAGES FOR A MANUALLY CONTROLLED ELECTRONIC VIDEO DISPLAY GAME

BACKGROUND OF THE INVENTION

Manual play electronic visual games are well known in the art. Representative disclosures of typical electronic visual games, and associated display circuitry, can be found in U.S. Pat. No. 3,631,457 to Hamada, et al.; U.S. Pat. No. 3,659,284 to Rusch; U.S. Pat. No. 3,659,285 to Baer, et al.; and U.S. Pat. No. 3,793,483 to Bushnell. The typical manual play electronic visual game is of the hockey, PING-PONG or tennis variety. The game is adapted to be played by a pair of players. Each player has a control unit, which he can use to control a cursor or paddle image, which is movable on a television or cathode ray screen. The cursor usually can be controlled in a single direction of movement only (for instance, up and down). The game circuitry also generates a puck or ball image, commonly a small square, which moves across the screen or "playing field". The circuitry which controls the ball calculates angles of incidence and reflection to duplicate as closely as possible, conditions under which an actual game might be played. The players are able to move their paddles along a single direction in order to deflect the moving square back into the other player's field of play. Normally, if the moving square and the cursor of a particular player do not intersect, the moving square moves behind the cursor; and a point is scored in favor of the opposite player. Thus, games similar to tennis, PING-PONG or volley ball can be played. Other more complicated games involve games somewhat similar to hockey, in that they involve making a shot in a specified goal area in order to accrue points. In these types of games, each of the players commonly controls a forward cursor and a number of rear cursors, which act as blocking cursors. However, the basic principles of the game remain the same.

Oftentimes, however, players who have become accustomed to various of the electronic visual games, find that it is becoming easier to play the particular game. Thus, the player's interest in the game begins to flag and the player may lose interest in the game completely and stop playing the game.

It is therefore desirable, if the electronic game has some facility for varying the velocity of the ball image both automatically and manually, to cause the ball image to move in an erratic fashion, thereby increasing the challenge of play.

What is needed, then, is a circuit which will generate control signals to cause the velocity of the ball, or puck image, to change at selected intervals automatically and also will control the velocity of the ball image by a signal introduced by a manual control.

SUMMARY OF THE INVENTION

A circuit for variable velocity control of a playing image of a manually controlled video display game is disclosed herein. A first electronic counter, or hit counter, is connected to a portion of the video display game which supplies a pulse signal whenever a ball image and a paddle image intersect. The first counter is connected to a second counter known as a speed counter. The speed counter is, in turn, connected to a portion of the circuitry of the game circuit which controls a horizontal component of velocity of the ball image generated on the screen. The speed counter is also connected through an exclusive OR gate to a grounding switch. The speed counter is also connected to other portions of the video game which produce pulses in synchronization with a horizontal synchronizing pulse produced by the game.

In operation, the hit counter receives pulses from other portions of the game coincident with the ball image intersecting the paddle image, and counts and stores a count of the pulses. The hit counter supplies signals to the speed counter indicative of the number of hits which have been encountered on a particular serve of the game. The speed counter, in turn, is running and and counting clock pulses synchronized with the horizontal synchronizing pulses. At the time the speed counter receives the hit count signals, the speed counter is parallel loaded with a number indicative of the number of hits, which number is added to the instant clock count. This parallel loaded number is added to the clock count and has the effect of making the output signal generated by the speed counter pulse at a more rapid rate. However, the horizontal velocity component of the ball image velocity increases as the output frequency of pulses from the speed counter decreases. When the grounding switch is closed, the ball image may be either speeded up or slowed down due to the action of the exclusive OR gate, depending upon at what horizontal speed the ball image is then traveling, thus adding a certain amount of randomness to the game. When the grounding switch is closed, the horizontal velocity component of the velocity of the ball changes, thereby changing both the speed at which the ball travels and the direction in which the ball is moving.

It is a principal object of the present invention to provide a circuit for controlling manually the velocity of a ball image of an electronic video game.

It is another object of the instant invention to provide a variable velocity control for playing images for manually controlled video games, which automatically controls the velocity of a ball image in response to playing parameter signals received from other portions of the game.

Other objects and uses of this invention will become obvious to one skilled in the art upon a perusal of the following specification and claims in light of the accompanying drawing.

DESCRIPTION OF THE PREFERRED EMBODIMENT

Figure 1:
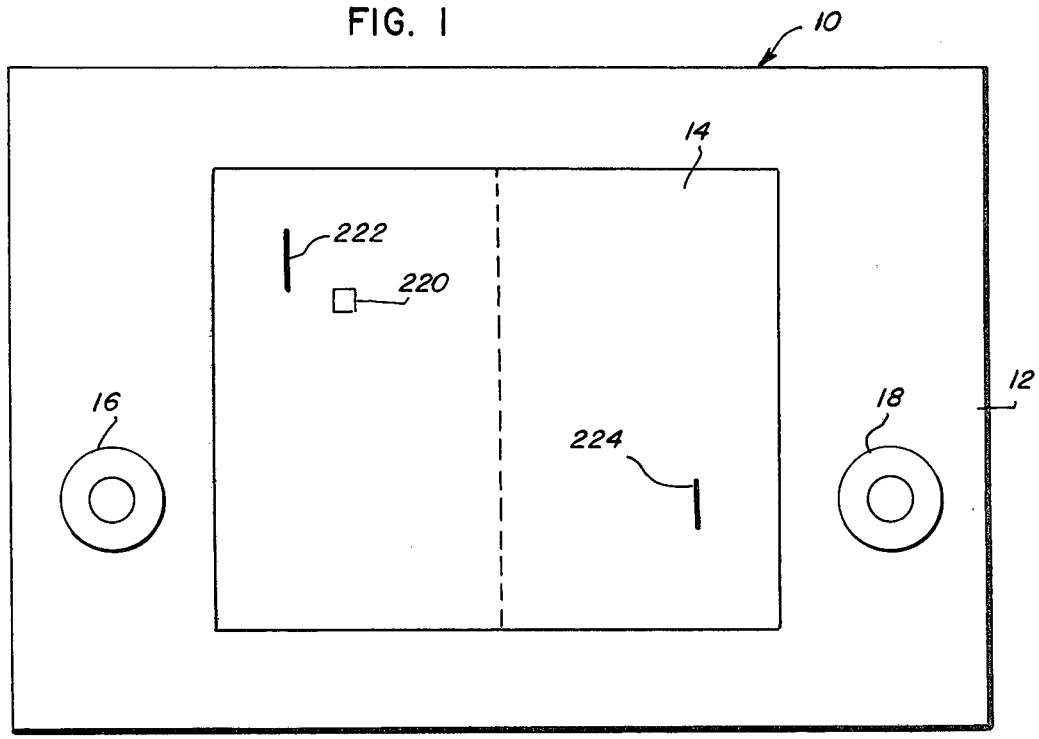
FIG. 1 is a top view of a manually controlled electronic video game, showing playing images and paddle images on a display screen.
Figure 3:
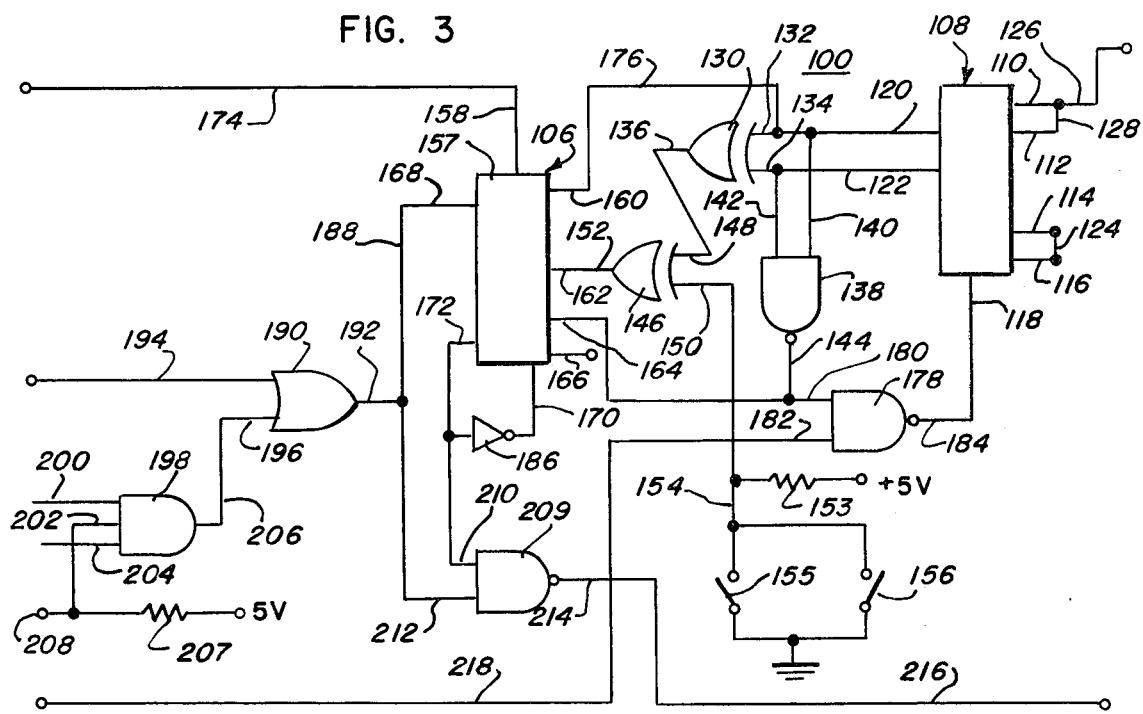
FIG. 3 is a schematic diagram of the variable velocity control circuit for playing images of FIG. 2.
Figure 2:
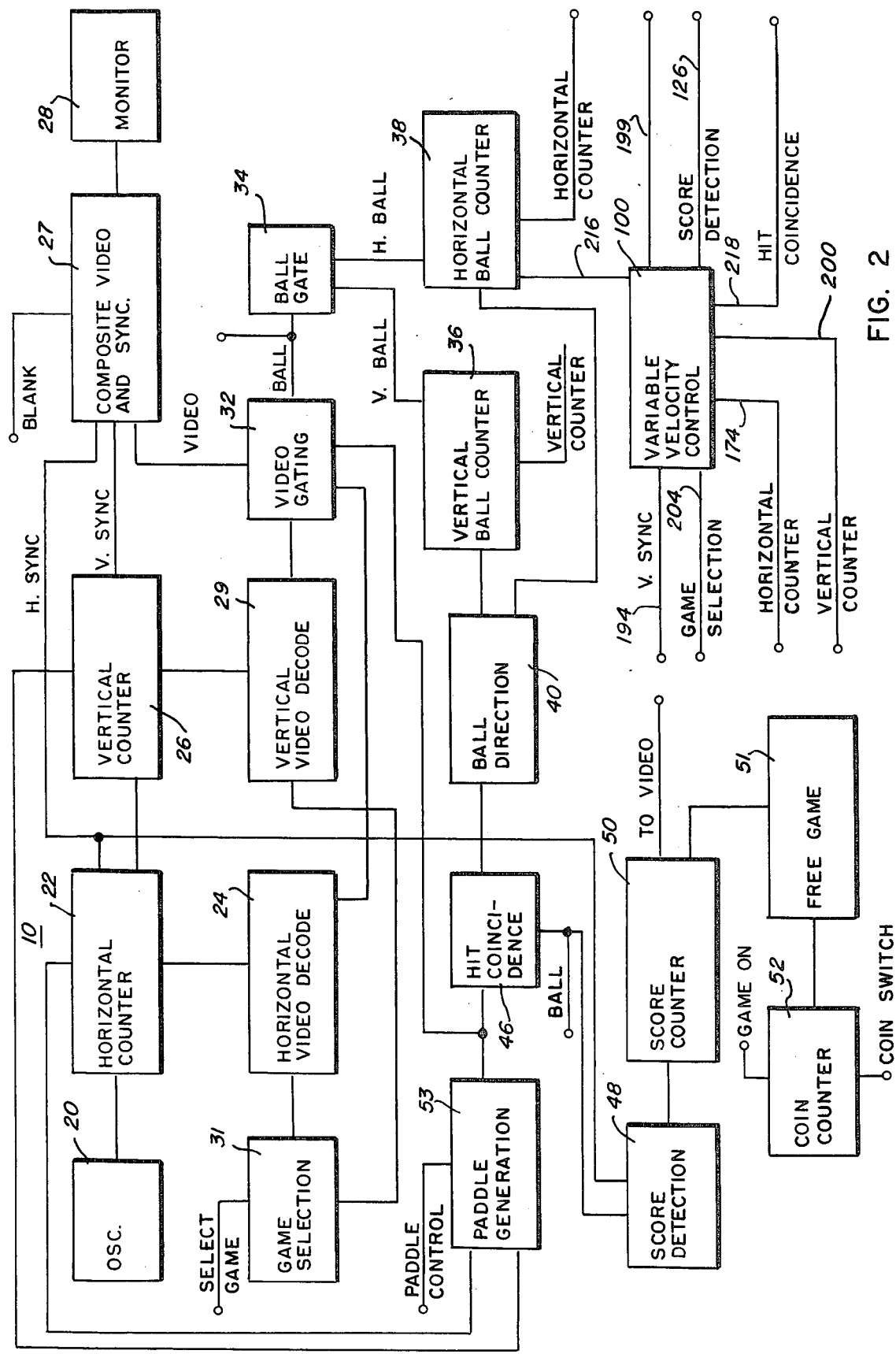
FIG. 2 is a block diagram of the manually controlled electronic video game, showing the inter-connection between the manually controlled electronic video game and a variable velocity control for playing images embodying the instant invention.

Referring now to the drawings, and especially to FIGS. 1 and 2, a manually controlled electronic video game, generally indicated by numeral 10, is shown therein. A block diagram is employed in FIG. 2, because the physical construction of the electronic video games is well known.

Electronic video game 10 has a console 12 in which is mounted a playing screen 14. A pair of paddle controls, respectively numbered 16 and 18, is mounted on console 12 on opposite sides of playing screen 14.

Electronic video game 10 is a conventional electronic video game. A local oscillator 20 is connected to a horizontal counter 22. Horizontal counter 22 is connected to a horizontal video decoder 24, a vertical counter 26, and a composite video and sync system 27. Composite video and sync system 27 is connected to a standard television monitor 28 which includes playing screen 14. Vertical counter 26 is connected to a vertical video decoder 29. Horizontal video decoder 24 is connected to a game selection circuit 31. Game selection circuit 31 and horizontal video decoder 24 and composite video and sync system 27 are all connected to a video gating circuit 32. Video gating circuit 32, in turn, is connected to the composite video and sync system 27.

A ball gate 24 is connected to video gating circuit 32. A vertical ball counter 36 is connected between the vertical counter 26 and ball gate 34. A horizontal ball counter 38 is connected between horizontal counter 22 and ball gate 34. A ball direction circuit 40 is connected to both vertical ball counter 36 and horizontal ball counter 38. The ball direction circuit 40 is connected to a hit coincidence circuit 46. Hit coincidence circuit 46 is, in turn, connected between ball gate 34 and video gating circuit 32; and is also connected to a score detection circuit 48. Score detection circuit 48 is connected to a score counter display 50. Score display 50 is connected to a video line between the video gating circuit 32 and the composite and synchronizing display circuit 28. A free game circuit 51 is connected to score counter 50. A coin counter 52 is connected to free game circuit 51. A paddle generator 53 is connected to hit coincidence circuit 46. Paddle generator 53 is connected to horizontal counter 22 and vertical counter 26.

An inventive variable velocity control for playing images 100 has a play condition sensing circuit 104, which is also a means for detecting playing parameters. A speed control circuit 106 is connected to play condition sensing circuit 104. Speed control circuit 106 is also a means for selectively controlling the velocity of a playing image.

Play condition sensor 104 of velocity control circuit 12 includes a hit counter 108. Hit counter 108 is a 7493 four bit counter. Hit counter 108 includes a pair of reset terminals 110 and 112, a low order flip-flop input terminal 114, a higher order clock pulse input terminal 116, a low order clock pulse input terminal 118, and a pair of high order bit output terminals 120 and 122 in which output terminal 122 is the highest order output terminal and output terminal 120 is the next highest order output terminal. A jumper 124 connects terminals 114 and 116. A line 126 connects reset terminal 110 to a source of reset control signals in the electronic video game. A jumper 128 connects reset terminals 110 and 112 together. Output terminals 120 and 122 of hit counter 108 are connected to an exclusive OR gate 130. Exclusive OR gate 130 includes a pair of input terminals 132 and 134 and an output terminal 136. Exclusive OR gate 130 is a 7086 OR gate. Exclusive OR gate 130 has input terminal 132 connected to output terminal 120 of hit counter 108. Exclusive OR gate 130 has input terminal 134 connected to output terminal 122 of hit counter 108. A NAND gate 138, having a pair of input leads 140 and 142 and an output lead 144 is connected by input lead 142 between terminals 122 and 134 of hit counter 108.

Input lead 140 is connected between output terminal 120 and input terminal 132 of hit counter 108 and exclusive OR gate 130, respectively. Output lead 136 of exclusive OR gate 130 is connected to an exclusive OR gate 146 at an input terminal 148. Exclusive OR gate 146 also has another input terminal 150 and an output terminal 152. Exclusive OR gate 146 is a 7086 exclusive OR gate. Input terminal 150 of exclusive OR gate 146 is connected in parallel to a resistance 153. Resistance 153 is, in turn, connected to a 5 volt potential source. Resistance 153 is connected to a lead 154 which is, in turn, connected to a pair of parallel velocity altering switches, respectively numbered 155 and 156. Velocity altering switches 155 and 156 are connected to ground.

Speed control circuit 106 includes a 74161 parallel loading 4 bit speed counter 157. Speed counter 157 includes a clock pulse input terminal 158 and a plurality of parallel loading input terminals, respectively numbered from the lowest order to the highest order, 160, 162, 164 and 166. Speed counter 157 also includes a parallel enable input terminal 168 and a count enable parallel input terminal 170. A terminal count output terminal 172 is also included in speed counter 157.

Clock pulse input terminal 158 is connected to a lead 174, which is, in turn, connected to horizontal counter 22. Low order parallel loading input terminal 160 is connected by a lead 176 to input terminal 132 of exclusive OR gate 130. Next higher order parallel input terminal 162, is connected to output terminal 152 of exclusive OR gate 146. Parallel loading terminal 164, the second highest order parallel loading terminal, is connected to an NAND gate 178 at an input terminal 180. NAND gate 178 also includes an input terminal 182 and an output terminal 184. Output terminal 184 of NAND gate 178 is connected to input terminal 118 of hit counter 108. Output terminal 144 of NAND gate 138 is connected between parallel loading terminal 164 of counter 106 and input terminal 180 of NAND gate 178. Both NAND gates 138 and 178 are 7400 NAND gates.

An inverter 186 is connected between total count output terminal 172 and input terminal 170, the count enable parallel input terminal of counter 106. A lead 188 is connected to parallel enable terminal 168 of counter 106. Lead 188 is connected to an OR gate 190 at an output terminal 192. OR gate 190 also has an input terminal 194 and another input terminal 196.

An AND gate 198, having a plurality of input terminals respectively numbered 200, 202 and 204, and an output terminal 206, is connected at output terminal 206 to input terminal 196 of OR gate 190. Input terminal 194 of OR gate 190 is connected to vertical counter 26. Input terminal 200 of AND gate 198 is connected to vertical counter 26. Input terminal 202 of AND gate 198 is connected between a 5 volt potential, a resistance 207 and a grounding switch 208. Input terminal 204 is connected to an autoplay control in game selection circuit 31.

Lead 188 is also connected to a 7400 NAND gate 209, having a pair of input terminals 210 and 212 and an output terminal 214 at input terminal 212. Input terminal 210 is connected to the junction of inverter 186 and output terminal 172 of speed counter 157. Output terminal 214 is connected to the horizontal ball counter 38.

In operation, oscillator 20 drives horizontal video decode circuit 24. Also, at intervals of 63.5 microseconds, horizontal counter generates a horizontal synchronizing pulse, which is delivered to composite video and sync circuit 27 and to lead 174 of speed counter 106.

Horizontal video decode circuit 24, in turn, sends a signal to video gating circuit 32. Horizontal counter 22 also has a periodic output which drives vertical counter 26. Vertical counter 26 provides a vertical synchronization to the composite video and sync circuit 27 and also vertical synchronization to lead 194 of OR gate 190. Vertical decoder 29 also receives a decoded count at periodic intervals from the vertical counter 26. Since the vertical counter 26 is driven by counting signals of integral multiples supplied by the horizontal counter, the vertical counter runs a much slower rate. The vertical video decode circuit 29, in turn, supplies a signal to video gating circuit 32. Horizontal counter 22 and vertical counter 26, in turn, drive horizontal ball counter 38, vertical ball counter 36, and paddle generator 52, respectively. Horizontal ball counter 38 and vertical ball counter 36 control a ball gate 34. Output from ball gate 34 if fed into video gating circuit 32. Video gating circuit 32 thus receives a ball image signal from ball gate 34. In addition, horizontal and vertical ball counters 38 and 36 supply respective signals to a ball direction circuit 40. Ball direction circuit 40 supplies a signal to hit coincidence circuit 46, indicative of position of a ball image 210.

Paddle generator 53 generates a pair of paddle images, respectively numbered 222 and 224. The position of paddle image 222 is controlled by paddle control 16. The position of paddle image 224 is controlled by paddle control 18.

Paddle generator 53 also supplies a signal to hit coincidence circuit 46. When the position of a paddle generated by paddle generator 53 and the ball image generated by ball direction circuit 40 coincide, hit coincidence circuit 46 generates a signal which is fed into the video gating circuit 32. If there is no hit, coincidence circuit 46 supplies a signal to score detection circuit 48. Score detection circuit 48, in turn, determines whether a first player or a second player missed striking the ball image and supplies a signal accordingly to score counter 50. Score counter 50 supplies a signal to the composite video and sync circuit 27. Score counter 50 generates an image of the score at that time between the two players. Score counter 50 supplies a score count to free game circuit 51 which allows a free game for preselected score differentials at the close of a particular game.

Upon service of ball image 220, hit counter 108 receives a one, or high pulse, through lead 126, which causes a one to be supplied to input terminals 110 and 112, which are the reset input terminals for hit counter 108. Hit counter 108 thereby resets to zero. Since terminal 114 and terminal 116 are connected by a jumper 124, hit counter 108 runs as a 4 bit counter rather than a 3 bit counter. A counting pulse, indicative of a hit or the intersection of a ball image and paddle image, is supplied through lead 218 to input terminal 182 from hit coincidence circuit 46. The counting pulse is a one pulse, or a high pulse. Therefore, as long as lead 180 is at zero, the positive counting pulses from hit coincidence circuit 46 are supplied through AND gate 178 to input clock terminal 118.

Clock terminal 118 receives the hit pulses which are the result of the ball image 220 intersecting a paddle image 222 or 224. The counter 108 stores the total hit count and outputs the second highest bit of the 4 bit count through terminal 120 and the highest bit of the count through terminal 122. Thus, terminal 120 is at one for a decimal four signal and terminal 122 is at one for a decimal eight signal. Therefore, when the number of hits is at zero through three, terminals 120 and 122 are both at zero. When the number of hits is four through seven, terminal 120 is at a one and terminal 122 is at a zero. When the number of hits is eight through eleven, terminal 122 is at a one and terminal 120 is at a zero. When the number of hits is 12 through 15, both terminals 120 and 122 output binary ones. The score signal is fed to exclusive OR gate 130. When exclusive OR gate 130 receives a one-zero combination at input terminals 132 and 134, it produces a one at output terminal 136. For a zero-zero, or a one-one combination at input terminals 132 and 134, output terminal 136 supplies a zero output.

Thus, one can consider zero to three hit counts as producing a speed range one; four to seven hit counts as producing a speed range two; eight to 11 hit counts as producing a speed range three; and 12 or more hit counts as producing a speed range four. When switches 155 and 156 are open, a decimal 14 is parallel loaded into counter 157 for speed range one; a decimal 13 is parallel loaded into counter 157 for speed range two; a decimal 12 is parallel loaded into counter 157 for speed range three; and a decimal 11 is parallel loaded into counter 157 for speed range four. When switches 155 or 156 are closed, a decimal 12 is parallel loaded into counter 157 for speed range two; a decimal 15 is parallel loaded into counter 157 for speed range three; and a decimal 12 is loaded into counter 157 for speed range four. Thus, for speed range one, when switch 156 is closed, the parallel loaded number is reduced. For speed ranges two, three and four, when switch 156 is closed, the parallel loaded number is increased. One player controls switch 155. An opposing player controls switch 156. Switches 155 and 156 are customarily hidden from view so that only one player can see each switch.

When the loading number is parallel loaded into counter 157, it is added to the count of clock pulses then stored in the counter 157, thereby causing counter 157, which has a maximum count of fifteen, to more rapidly reach its maximum count and more rapidly produce pulses at output terminal 172. Thus, when 155 and 156 are opened, output pulses at output terminal 172 are produced most rapidly for speed range one and least rapidly for speed range four. When either switch 155 or 156 is closed, output pulses are produced at the same rate for speed ranges one and four and at the same rate for speed ranges two and three. As each of these output one pulses is produced at terminal 172, the pulse is inverted and supplied back to terminal as a zero pulse to lock counter 157 off temporarily. The pulses are also supplied to input terminal 210 of NAND gate 209. Normally, input terminal 212 of NAND gate 209 is held low by output terminal 192 of OR gate 190.

Normally, AND gate 198 receives a one input at input terminal 202. AND gate 198 also normally receives a positive or one signal at input terminal 204. Input terminal 200 receives a clock frequency pulse signal from vertical counter 26, causing one pulses to be outputted at terminal 206. If either terminals 202 or 204 are held low, indicating an auto play or fast ball condition, counter 157 is locked in speed range four.

Input terminal 194 of OR gate 190 only goes low when a vertical synchronizing pulse is received from vertical counter 26. Thus, outputting a binary zero to parallel enable terminal 168 of counter 157 and also to terminal 202 of NAND gate 209. The zero enables parallel loading to take place at counter 157 at the next clock pulse and also enables output pulses from terminal 172 to be transmitted through NAND gate 209 to horizontal ball counter 38.

The more rapidly the output timing pulses are received at horizontal ball counter 38, the lower the horizontal velocity of the ball image or playing image is driven. The more slowly output timing pulses are received at the horizontal ball velocity counter, the higher is the horizontal ball image velocity. Thus, with switch 156 open for speed range one through four, the ball moves relatively slowly in speed range one and increases in velocity through speed ranges two, three and four, until it reaches its highest velocity at speed range four. When the switches 155 or 156 are closed by a player, the horizontal velocity of the ball image 220 is increased in speed range one and decreased in speed ranges two, three and four, thereby adding a certain randomness to the play. When counter 108 reaches full count, NAND gate 138 locks out counter 108 by holding input terminal 180 of NAND gate 178 at zero.

Hit counter 108 is reset by pulses received from score detection circuit 48 through lead 126. The reset pulses zero hit counter 108 when the ball is served after a point is scored. The entire cycle can then begin again.

It may be appreciated that since it is the horizontal velocity component which is being selectively controlled, the vertical velocity of the ball remains constant. Thereby changing horizontal velocity changes the total velocity of the ball, both as to speed and direction for each of the speed ranges, whether switches 155 or 156 are open or closed. The variable velocity control then adds to the challenge of play of the game, since as each player accumulates more hits, the horizontal velocity of the ball increases, making it more difficult to intercept with a paddle image. Furthermore, since each of the players could control switches 155 or 156, the challenge of the play of the game is increased when switch 155 or 156 is closed and the velocity of the ball, both direction and speed, is quickly altered, thereby changing the point of intersection for which paddle 222 or 224 must be moved in order to successfully play the ball image 220.

Although a specific embodiment of the variable velocity control has been described in detail above, it is apparent that a man skilled in the art may make various modifications and changes in the instant inventive circuit without departing from the spirit and scope of the present invention. The present invention is, therefore, limited only by the appended claims.

What is claimed is:

1. A variable velocity control circuit for playing images for use with a manually controlled electronic video game comprising: a play condition sensing circuit, said play condition sensing circuit being adapted to receive playing condition signals from a play condition indicating circuit of the electronic video game indicative of a particular play condition, said play condition sensing circuit producing play condition output signals; a velocity control circuit connected to the play condition sensing circuit, said velocity control circuit being responsive to said play condition output signals received from the play condition sensing circuit to thereby impress a change in velocity on a playing image in response to said play condition output signal; said play condition sensing circuit including a counter, said counter being adapted to receive said play condition signals from the play condition circuit; said velocity control circuit including logic means responsive to the output of said counter for generating said play condition output signals indicative of a plurality of speed ranges of the playing image; and said velocity control circuit including means responsive to said play condition output signals for generating control signals at different rates of speeds corresponding to said play condition output signals.

2. A variable velocity control circuit for playing images for a manually controlled electronic video game as defined in claim 1, further including means for generating playing and paddle images; said play condition counter receives play condition signals from a hit coincidence circuit of said manually controlled electronic video game when a playing image intersects a paddle image, thus indicating a hit; means for detecting image intersection to generate intersection indicative pulse signals; wherein said play condition sensing circuit includes a digital counter, said digital counter being connected to other portions of said electronic video game to receive intersection indicative pulse signals when a paddle image and a playing image intersect.

3. A variable velocity control circuit for playing images for a manually controlled electronic video game as defined in claim 2, in which said play condition counter is a 4 bit counter having a pair of terminals which provide output signals for the two highest order bits of said 4 bit counter, said output terminals being connected to said velocity control circuit.

4. A variable velocity control circuit for playing images for a manually controlled electronic video game as defined in claim 1, in which said velocity control circuit is a counter.

5. A variable velocity control circuit for playing images for a manually controlled electronic video game as defined in claim 4, in which said velocity counter is a digital counter.

6. A variable velocity control circuit for playing images for a manually controlled electronic video game as defined in claim 5, wherein said velocity counter is a digital 4 bit counter, having a first, a second, a third and a fourth parallel loading terminal, said first, second, third and fourth parallel loading terminals being adapted to receive binary signals from said play condition sensing circuit to be added to an instant count stored in said counter.

7. A variable velocity control circuit for playing images for a manually controlled electronic video game as defined in claim 6, in which said velocity counter has a clock terminal, said clock terminal being connected to receive signals from a horizontal counter of said manually controlled electronic video game.

8. A variable velocity control circuit for playing images for a manually controlled electronic video game as defined in claim 1, wherein said velocity control circuit further includes player operated manual switch means for overriding selectively said logic means to cause it to generate other ones of said play condition output signals indicative of other speed ranges of the playing image.

9. A variable velocity control circuit for playing images for use with a manually controlled electronic video game comprising: a play condition sensing circuit, said play condition sensing circuit being adapted to receive play condition signals from a play condition indicating circuit of the manually controlled electronic video game indicative of a particular play condition, said play condition sensing circuit having a 4 bit digital counter, said 4 bit digital counter having a pair of terminals which provide output signals for the two highest order bits of said 4 bit counter, said pair of output terminals being connected to a first logic gate, a second logic gate connected to said first logic gate, said second logic gate having a first input terminal connected to said first logic gate, said second logic gate having a second input terminal connected to a variable source of potential, an output terminal of said second logic gate connected to a velocity control circuit, said logic gates providing a single binary signal to a selected input terminal of said velocity control circuit, an inverter connected to receive said single binary input signal, inverting said single binary input signal when said potential of said variable source of potential is varied, said velocity control circuit producing a control signal in response to said play condition output received from the play condition sensing circuit to impress thereby a change in velocity of a playing image in response to said play condition output circuit.

10. A variable velocity control circuit for playing images for a manually controlled electronic video game comprising: a 4 bit digital hit counter, said 4 bit digital hit counter having a reset terminal, a clock terminal, and a plurality of output terminals, said reset terminal of said 4 bit digital hit counter being connected to a score detection circuit of said manually controlled electronic video game to receive reset signals from said score detection circuit when a score is made, said clock terminal of said 4 bit digital counter being connected to a hit coincidence circuit to receive hit coincidence signals from said hit coincidence circuit when a paddle image and a playing image intersect, said 4 bit digital hit counter counting said pulses received from said hit coincidence circuit and storing a count of said pulses received from said hit coincidence circuit, said 4 bit digital hit counter producing a binary signal at its output terminals, indicative of said stored count, a pair of said output terminals being connected to a pair of input terminals of a first exclusive OR gate, an output terminal of said first exclusive OR gate being connected to an input terminal of a second exclusive OR gate, a first NAND gate having a pair of input terminals and an output terminal having each of its input terminals connected to a respective lead of said pair of output terminals of said 4 bit digital hit counter, one of said output terminals of said first NAND gate being connected to said clock terminal of said 4 bit digital hit counter, said first NAND gate serving to lock out said 4 bit digital hit counter when said 4 bit digital hit counter reaches a full count; a velocity control counter having a plurality of parallel input terminals, a clock terminal, a parallel enable terminal, a count enable parallel terminal, and an output terminal is connected to one of said 4 bit digital hit counter output terminals at a parallel input terminal, said velocity control counter being connected to said output terminal of said second exclusive OR gate at another of said parallel input terminals, said velocity counter being connected to said output terminal of said first NAND gate at another parallel input terminal, said velocity counter being connected to a horizontal counter to receive horizontal synchronizing pulses at its clock terminal, said parallel input terminal of said velocity control counter being connected to selectively receive vertical synchronizing pulses from a vertical counter, said parallel input terminals receiving signals indicative of a selected hit count from said hit counter, said input to said parallel input terminals being selectively alterable by opening or closing a grounding switch connected to the second input terminal of the second exclusive OR gate, said signals supplied to said parallel input terminals being added to a stored count of said velocity control counter, said velocity control counter having a selected maximum count, said velocity control counter producing an output pulse upon reaching said selected maximum count, said output pulse being supplied to a horizontal ball counter at a rate inversely proportional to a horizontal ball image velocity component produced by said horizontal ball counter.

11. A variable velocity control circuit for playing images for use with a manually controlled electronic video game comprising: a play condition sensing circuit, said play condition sensing circuit being adapted to receive play condition signals from a play condition indicating circuit of the electronic video game indicative of a particular play condition, said play condition sensing circuit producing a play condition output signal; a velocity control circuit connected to the play condition sensing circuit, said velocity control circuit producing a control signal in response to said play condition output signal received from the play condition sensing circuit to thereby impress a change in velocity on a playing image in response to said play condition output signal; means for generating playing and paddle images; means for detecting image intersection to generate intersection indicative pulse signals; said play condition sensing circuit including a digital counter, said digital counter being connected to other portions of said electronic video game to receive said intersection indicative pulse signals when a paddle image and a playing image intersect; said play condition counter being a 4 bit counter having a pair of terminals which provide output signals for the two highest order bits of said 4 bit counter, said output terminals being connected to said velocity control circuit; said output terminals from said two high order bits being connected through a gate to provide a single input signal to said velocity control circuit.

12. A variable velocity control circuit for playing images for use with a manually controlled electronic video game comprising: a play condition sensing circuit, said play condition sensing circuit being adapted to receive play condition signals from a play condition indicating circuit of the electronic video game indicative of a particular play condition, said play condition sensing circuit producing a play condition output signal; a velocity control circuit connected to the play condition sensing circuit, said velocity control circuit producing a control signal in response to said play condition output signal received from the play condition sensing circuit to thereby impress a change in velocity on a playing image in response to said play condition output signal; said velocity control circuit being a digital 4 bit counter, having a first, a second, a third and a fourth parallel loading terminal, said first, second, third and fourth parallel loading terminals being adapted to receive binary signals from said play condition sensing circuit to be added to an instant count stored in said counter; said counter having a clock terminal, said clock terminal being connected to receive signals from a horizontal counter of said manually controlled electronic video game; said velocity counter storing a subtotal count and provides an output pulse to a horizontal ball counter of said manually controlled electronic video game when said subtotal count reaches a selected maximum count, said subtotal count being a sum of stored clock pulses received through said clock terminal and a parallel loading count received through said parallel loading terminals.

13. A variable velocity control circuit for playing images for a manually controlled electronic video game as defined in claim 12, wherein said variable velocity counter receives said parallel count from said play condition sensing circuit, said parallel loading count being indicative of the number of signals which said play condition sensing circuit has received, said parallel loading count being alterable by closing a switch connected to a gate, said gate being connected to a parallel loading terminal of said counter.

* * * * *